May 1, 1928. 1,668,247
W. MORAVA
COTTON PICKING MACHINE
Filed July 6, 1926 6 Sheets-Sheet 1
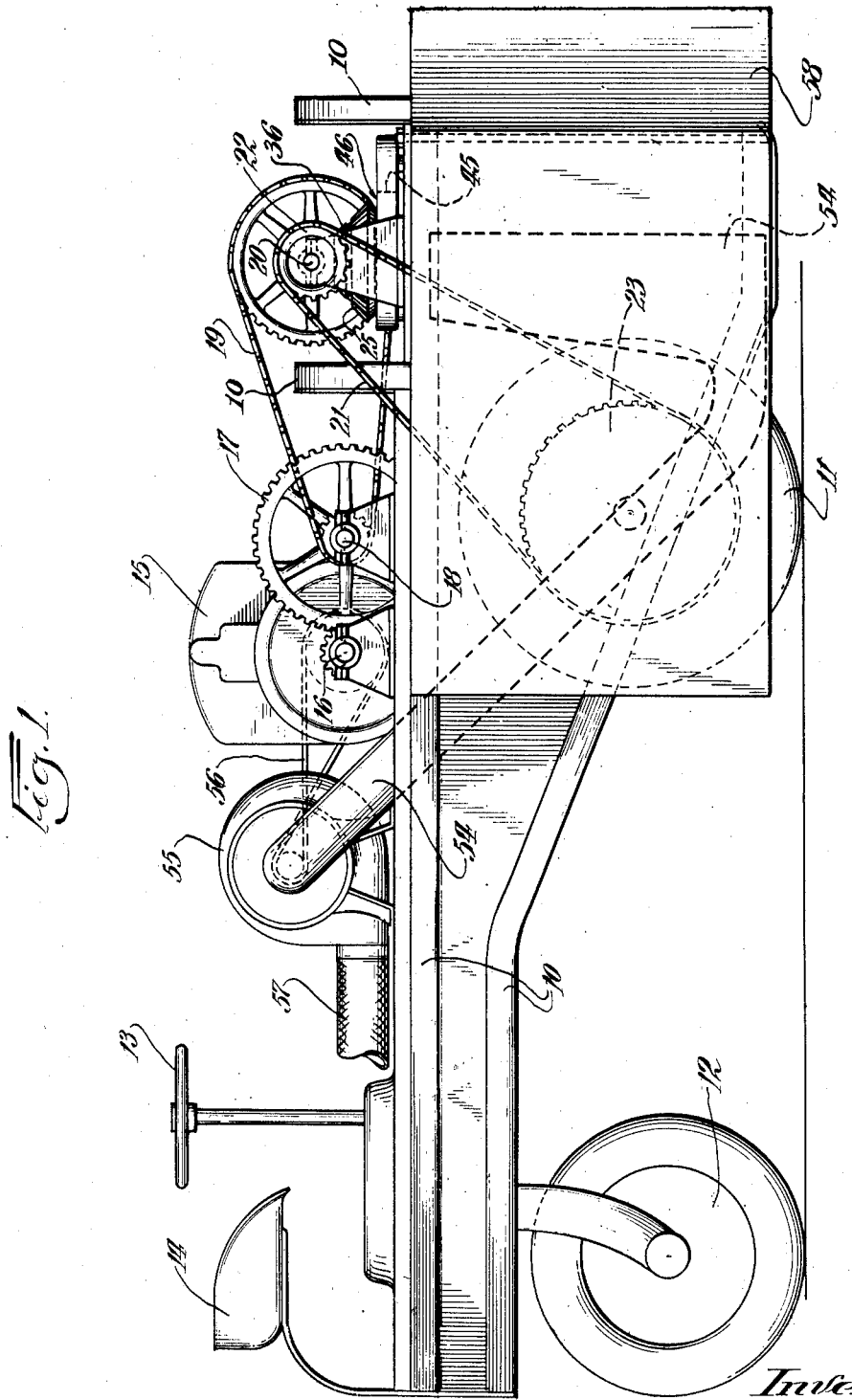

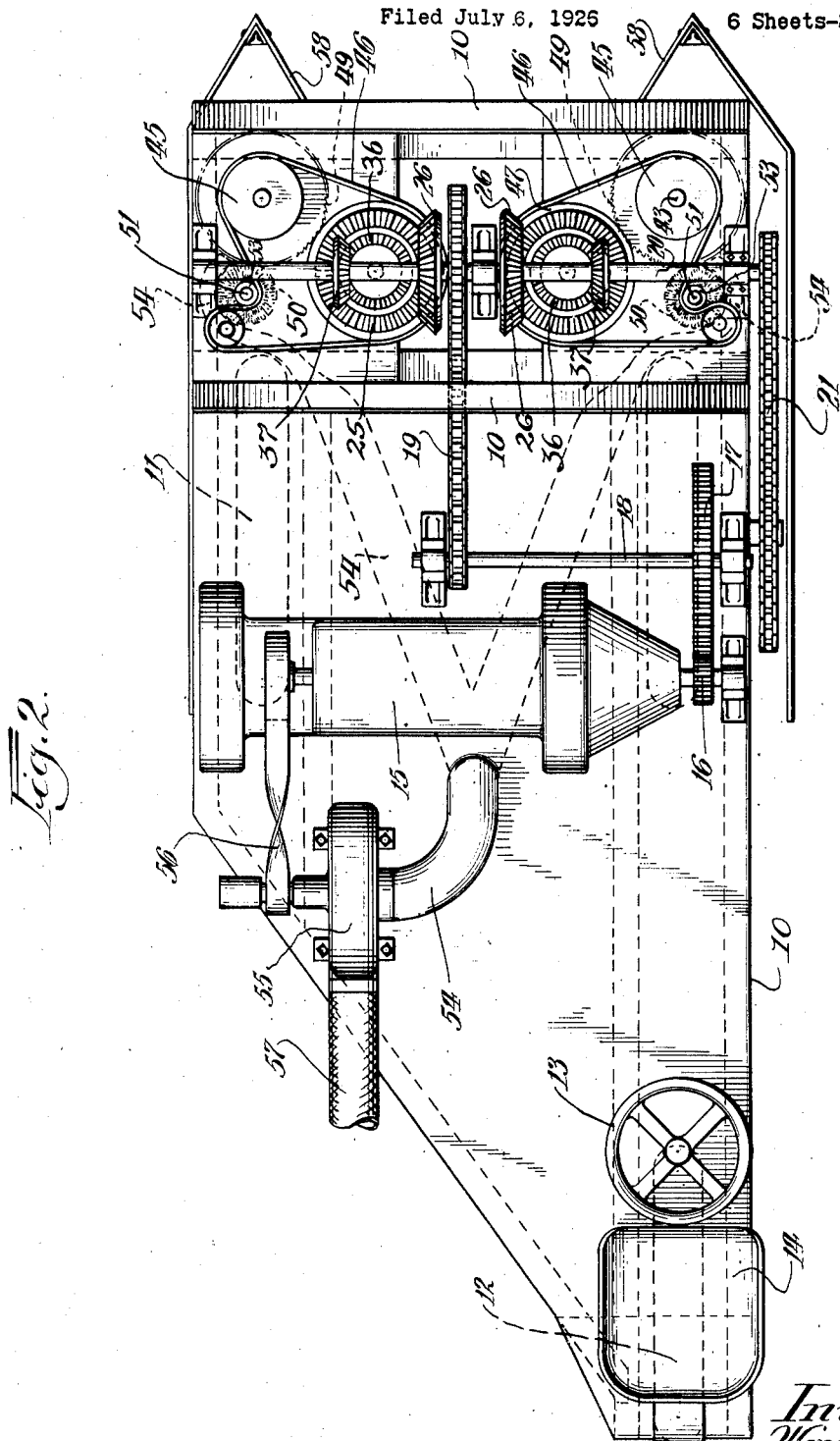

May 1, 1928.
W. MORAVA
1,668,247
COTTON PICKING MACHINE
Filed July 6, 1926    6 Sheets-Sheet 3
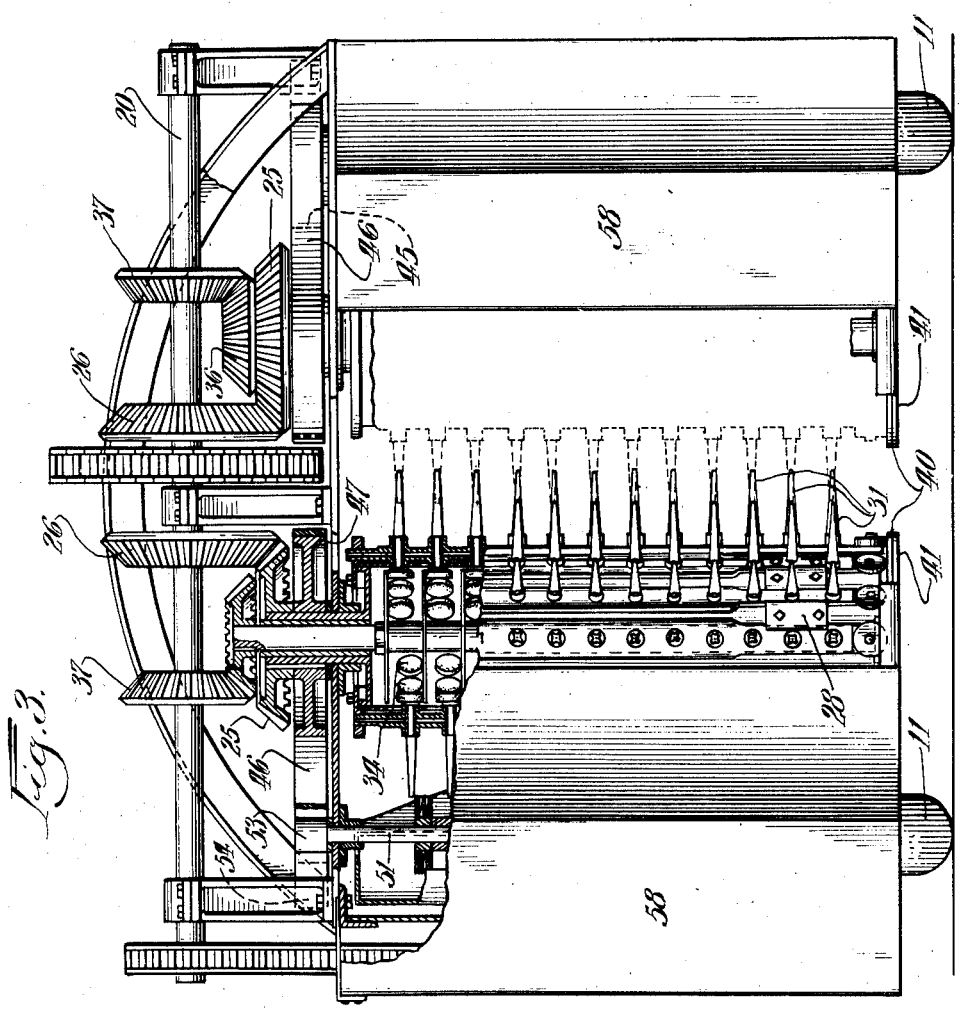

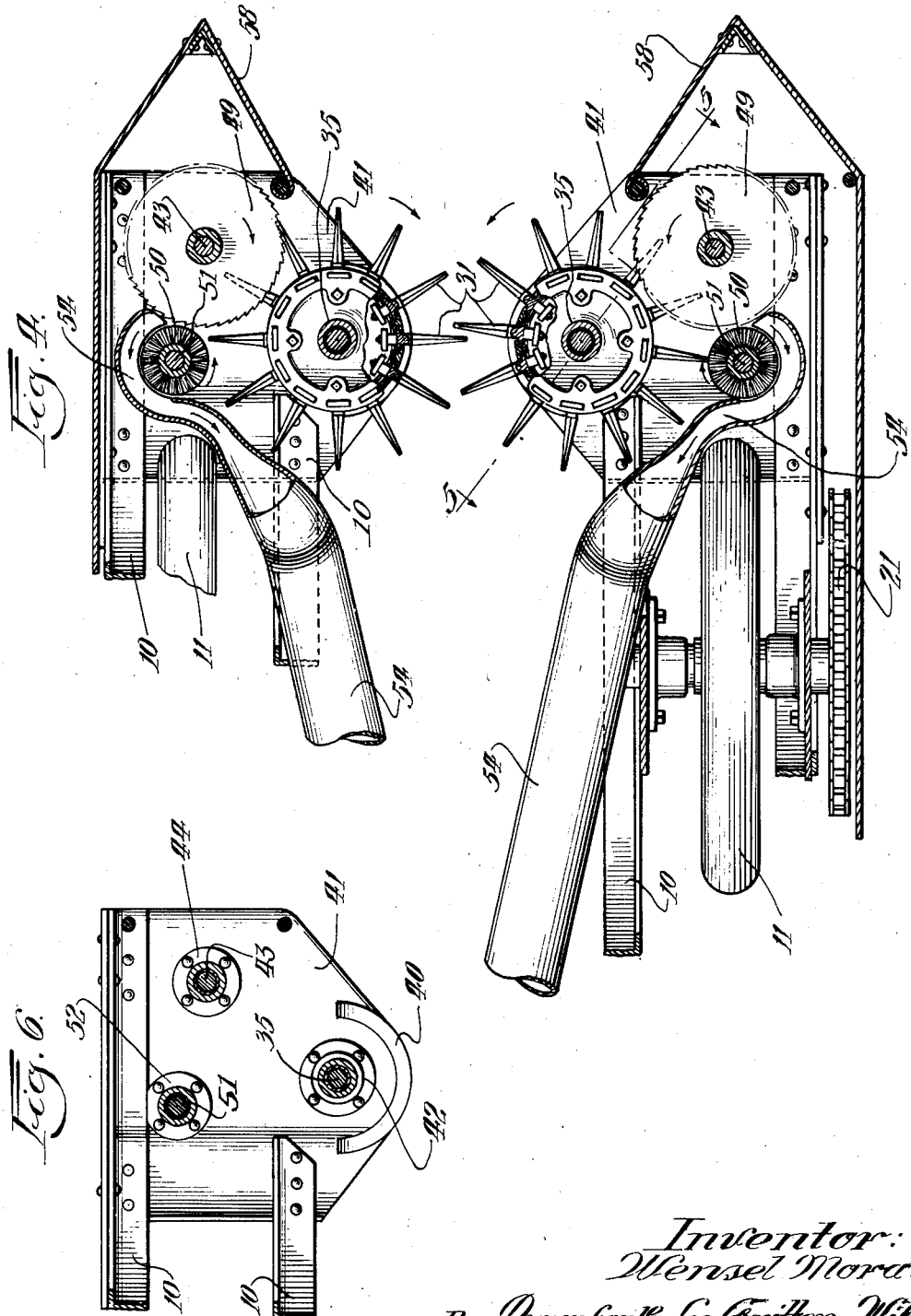

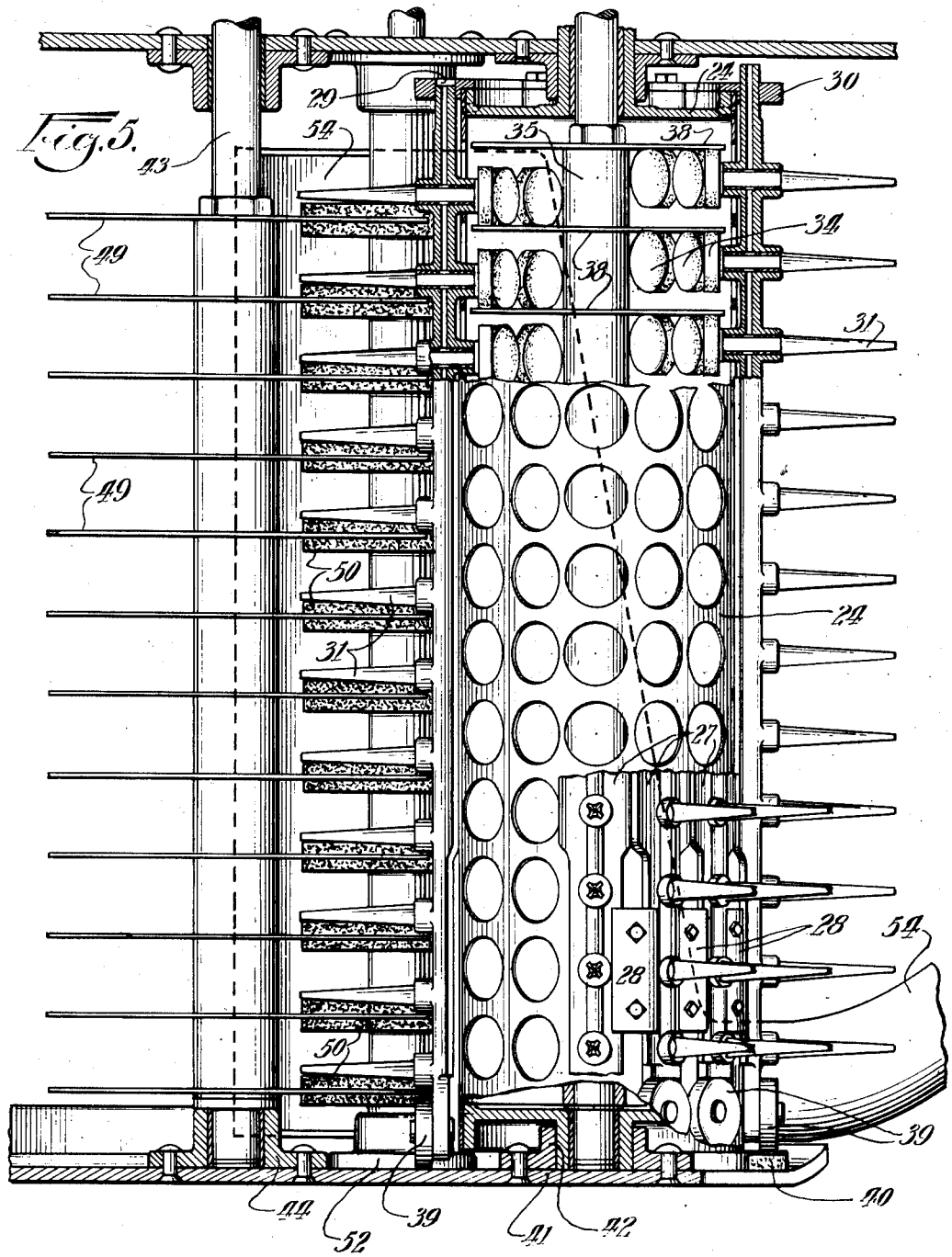

May 1, 1928.
W. MORAVA
1,668,247
COTTON PICKING MACHINE
Filed July 6, 1926 6 Sheets-Sheet 6
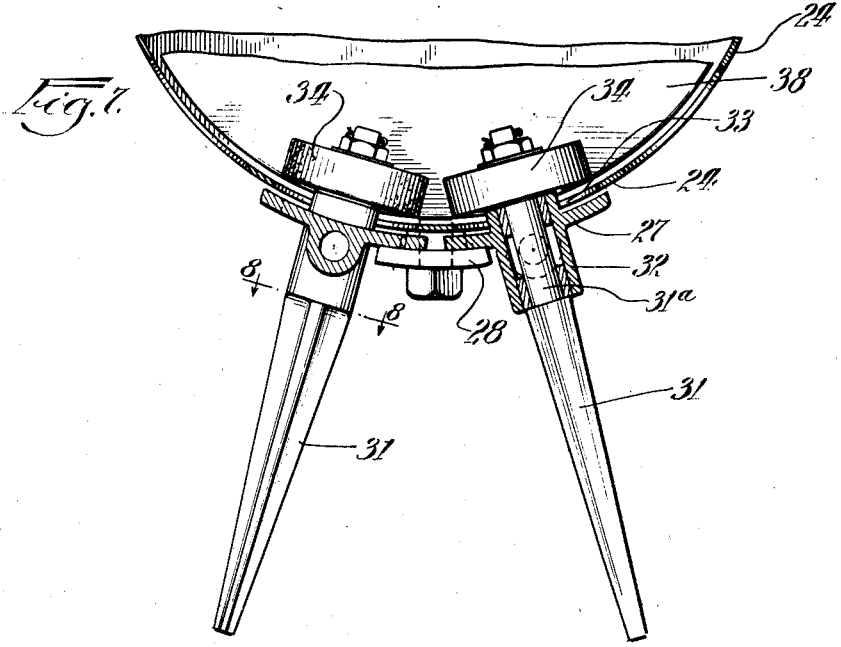
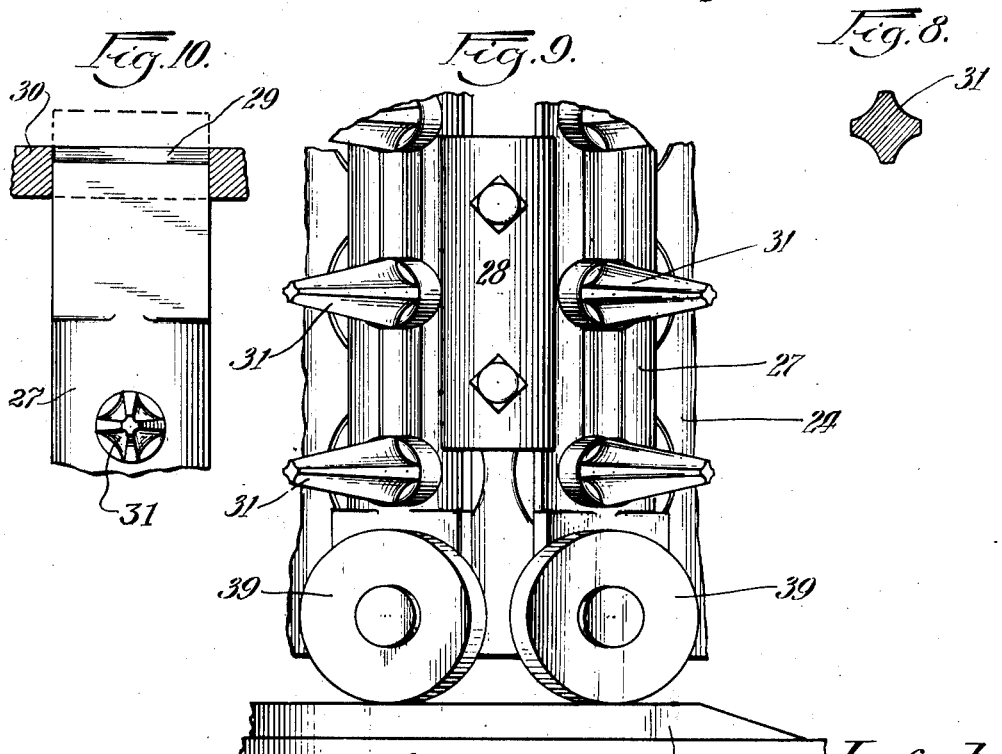

Patented May 1, 1928.

1,668,247

UNITED STATES PATENT OFFICE.

WENSEL MORAVA, OF CHICAGO, ILLINOIS.

COTTON-PICKING MACHINE.

Application filed July 6, 1926. Serial No. 120,667.

This invention relates to improvements in cotton picking machines and more especially to such a machine adapted for picking ripe cotton directly from the plants in the field.

The machine is designed to be self-propelled, the operator riding on the machine itself; and is here shown as provided with pneumatic tires and operated by a gasoline engine so that it may run over practically any part of an ordinary cotton field.

Among the features of my invention is the provision of a cotton picking machine that is very quick and efficient in operation, and which may be easily driven and directed. In the device shown herein, I make use of one motor for driving the picking mechanism and the machine itself.

Other features and advantages of my invention will appear more fully as I proceed with my specification.

In that form of device embodying the features of my invention shown in the accompanying drawings, Fig. 1 is a view in side elevation of a cotton picking machine, Fig. 2 is a top plan view thereof, Fig. 3 is a similar view in front elevation showing portions broken away, Fig. 4 is a horizontal sectional view taken through the picking mechanism, Fig. 5 is a view taken on an enlarged scale as indicated by the line 5—5 of Fig. 4, Fig. 6 is a top plan view of one of the bottom supporting plates carrying the lower ends of the picker finger driving shaft, saw shaft, and brush shaft, Fig. 7 is a detailed view on an enlarged scale of two of the picker fingers, Fig. 8 is a view taken as indicated by the line 8—8 of Fig. 7, Fig. 9 is a view on an enlarged scale of the lower end of one of the picker finger cylinders, and Fig. 10 is a view on an enlarged scale of the upper end of one of the picker finger staves.

In general, it might be stated that the cotton picking mechanism is carried at the front of the machine and comprises in general two upright cylinders revolving towards each other at approximately the same surface speed as the travel of the machine in a field. These cylinders are provided with rotating radially arranged picking fingers, the cylinders being close enough together so that there is a slight overlapping of the ends of the fingers. In operation, the fingers are caused to rotate in one direction while passing through the plant, thus causing the cotton to be wound about them and to be pulled from the plant. After the fingers leave the plant, they are caused to rotate in the opposite direction in order to assist in loosening the harvested cotton from the fingers. I do not depend on this reverse rotation of the fingers in order to entirely free the cotton therefrom, but when it has been thus loosened or fuzzed up the fingers pass by a spindle of saws which preferably are revolving in an opposite direction from that of the cylinders carrying the picking fingers. The saws entirely remove the cotton from the fingers and it is, in turn, brushed off of the saws by rapidly rotating brushes. The cotton is released from the brushes by centrifugal force and is then sucked up and delivered into any container or wagon.

I will now describe the construction and operation more in detail. As shown in the drawings, 10 indicates a suitable frame or chassis here shown as supported on the two forward wheels 11, 11 and the single rear steering wheel 12, which is controlled by a suitable steering wheel 13. 14 indicates a seat for a driver. 15 indicates a suitable motor such as, for example, an internal combustion motor adapted to propel the machine itself and drive the cotton picking mechanism. The shaft of the motor carries the pinion 16 driving the gear 17 mounted on the counter-shaft 18. By means of a chain 19 and suitable sprockets, the counter-shaft 18 drives the picking mechanism driving shaft 20. The machine is propelled by means of a chain 21 driven by a sprocket wheel 22 on the end of the shaft 20, which chain in turn drives one of the front wheels 11 by means of the sprocket 23.

Suitable transmission gearing, clutches, and the like (not shown in detail) may be provided as desired.

I will now describe more in detail the cotton picking mechanism. As stated before, this is driven by the shaft 20. This mechanism comprises two parallel vertically arranged adjacent cylinders 24, 24 rotating toward each other and driven by the bevel gears 25, 25, which are in turn driven by the bevel gears 26, 26 on the shaft 20. Each of the cylinders carries twelve vertically slidable staves 27, 27, slidably mounted on the cylinder 24 by means of the overlapping guide plates 28, 28 at their lower ends, the upper ends of said staves operating through slots 29 in the flange 30 at the upper edge of the cylinder 24. Each of the staves 27 carries a series of picking fingers, here shown as twelve in number indicated by 31. These fingers are preferably somewhat pointed, or tapering, or conical in shape and preferably provided with four longitudinal projections or ribs throughout the entire length, one of such fingers being shown in cross section in Fig. 8. It is obvious, however, that such fingers may be of any desired shape, and milled, shaped, corrugated, or roughened in order to give the best picking efficiency. Each of the fingers 31 is mounted on a shaft 31ᵃ rotatably mounted in a bearing 32 formed in the stave 27, the inner end of the bearing projecting through the cylinder 24. Suitable vertical slots 33, 33 are provided in the wall of the cylinder 24 in order to accommodate the inner ends of the bearings 32 and permit the up and down sliding movement of the staves 27. The inner ends of the shafts 31ᵃ carry friction wheels 34, 34 inside of the cylinders 24, which are preferably made of rubber, fiber or other suitable material.

Concentrically arranged within each of the cylinders 24 is a vertical shaft 35 carrying on its upper end a bevel gear 36 driven by the bevel gear 37 on the shaft 20. It will be seen that the direction of rotation of the shaft 35 is in the opposite direction from that of the cylinder 24. The shaft 35 carries a series of driving disks 38, 38, the peripheries of which are adapted to frictionally engage the friction wheels 34 on the inner ends of the picking fingers.

Mechanism is provided so that the picking fingers 31 will rotate in one direction during substantially half of the rotation of the cylinder 24 and in the opposite direction during the other half of the rotation of the cylinder 24. This is accomplished in the following manner. The staves 27 carrying the picking fingers as stated above are adapted for vertical sliding movement on the cylinders 24. The lower end of each stave is provided with a roller 39. 40 indicates a semi-circular raised cam track on the plate 41 carrying the lower bearing 42 of the cylinder 24. During the rotation of the cylinder, the rollers 39 run up on the track 40 during substantially half of such rotation, thus raising the staves. The disks 38 and friction rollers 34 are so spaced and proportioned that when the staves are raised the friction rollers 34 will engage with the undersides of the disks 38. When lowered they will engage with the upper sides of said disks. It will be seen, therefore, that during substantially one-half of the rotation of the cylinders the fingers will rotate in one direction and that their direction will be reversed during the other half of such rotation of the cylinders. The cam track 40 is so placed and arranged that the rotation of the picking fingers 31 will be in one direction during substantially the entire time that such fingers are in engagement with the cotton being picked from the plant, their direction of rotation being reversed after the fingers leave the plant in order to assist in the stripping operation.

Adjacent each of the cylinders 24 is arranged a shaft 43 having its lower end supported in a bearing member 44 on the plate 41. The upper end of the shaft 43 is provided with a suitable bearing member and also has a belt wheel 45 driven by a belt 46 from a belt wheel 47 mounted on the upper end of the shaft 35 carrying the cylinder 24. The shaft 43 carries a series of circular saws 49, the peripheries of which lie adjacent the picking fingers 31 as they leave the plant. The saws 49 are rotated by means of the rotation of the shaft 43 and serve to strip the cotton from the fingers 31.

The cotton is removed from the saws 49 by means of a series of rapidly rotating brushes 50 mounted on the shaft 51, the lower end of which is carried in the bearing member 52 mounted on the plate 41. The upper end of the shaft 51 is driven by a small belt wheel 53, which is also driven by the belt 46. 54 indicates an idler belt wheel to take up slack.

The cotton is freed from the brushes 50 by means of centrifugal force and carried away through the suction pipes 54, a suitable suction being maintained by the fan 55 driven by the belt 56 from the motor 15. From the fan 55, the cotton is discharged through the pipe 57 to any suitable receptacle, wagon or container (not shown).

58, 58 indicate converging guide plates adapted to direct the plants toward the picking fingers as the machine moves forward.

The arrows in the drawing indicate the directions of rotation of the various parts. While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim is new, and desire to secure by Letters Patent, is:

1. A device of the character described comprising; a cylinder; means for rotating said cylinder; a plurality of vertically slidable staves mounted on said cylinder; a plurality of picking fingers rotatably mounted in each of said staves; friction wheels inside of said cylinders carried by the inner ends of said picking fingers; a concentrically arranged shaft lying inside of said cylinder; a plurality of driving disks on said shaft; means for rotating said shaft; means for raising said staves during a portion of the rotation of said cylinder to cause said friction wheels to engage the under surfaces of said driving disks to drive said fingers in one direction; and means for lowering said staves during the remainder of the rotation of said cylinder to cause said friction wheels to engage the upper surfaces of said driving disks to rotate said fingers in the reverse direction.

2. A device of the character described comprising; a cylinder; means for rotating said cylinder; a plurality of vertically slidable staves mounted on said cylinder; a plurality of picking fingers rotatably mounted in each of said staves; friction wheels inside of said cylinders carried by the inner ends of said picking fingers; a concentrically arranged shaft lying inside of said cylinder; a plurality of driving disks on said shaft; means for rotating said shaft; means for raising said staves during a portion of the rotation of said cylinder to cause said friction wheels to engage the under surfaces of said driving disks to drive said fingers in one direction; means for lowering said staves during the remainder of the rotation of said cylinder to cause said friction wheels to engage the upper surfaces of said driving disks to rotate said fingers in the reverse direction; and stripping means lying adjacent said fingers while rotating in said reverse direction.

3. A device of the character described comprising; a cylinder; means for rotating said cylinder; a plurality of vertically slidable staves mounted on said cylinder; a plurality of picking fingers rotatably mounted in each of said staves; friction wheels inside of said cylinders carried by the inner ends of said picking fingers; a concentrically arranged shaft lying inside of said cylinder; a plurality of driving disks on said shaft; means for rotating said shaft; means for raising said staves during a portion of the rotation of said cylinder to cause said friction wheels to engage the under surfaces of said driving disks to drive said fingers in one direction; means for lowering said staves during the remainder of the rotation of said cylinder to cause said friction wheels to engage the upper surfaces of said driving disks to rotate said fingers in the reverse direction; and stripping means lying adjacent said fingers while rotating in said reverse direction, said means for raising said staves comprising a raised circular cam track adapted to be engaged by rollers mounted on the lower ends of said staves.

4. In a device of the character described; a pair of parallelly arranged cylinders; means for rotating said cylinders toward each other; a plurality of vertically slidable staves mounted on each of said cylinders; a series of picking fingers rotatably mounted on each of said staves; friction wheels mounted on the inner ends of said picking fingers and lying inside of said cylinders; a concentrically arranged shaft lying inside of each of said cylinders; a plurality of driving disks on said shafts; means for driving said shafts; a raised circular cam track adjacent the bottom of each of said cylinders; cam rollers on the lower ends of said staves, said cam rollers adapted to ride up on said cam tracks and raise said staves during a portion of the rotation of each of said cylinders; said driving disks adapted to be engaged by said friction rollers on their undersides when said staves are raised to rotate said picking fingers in one direction and adapted to be engaged on their upper sides by said friction disks when said staves are down to drive said picking fingers in a reverse direction.

5. In a device of the character described; a pair of parallelly arranged cylinders; means for rotating said cylinders toward each other; a plurality of vertically slidable staves mounted on each of said cylinders; a series of picking fingers rotatably mounted on each of said staves; friction wheels mounted on the inner ends of said picking fingers and lying inside of said cylinders; a concentrically arranged shaft lying inside of each of said cylinders; a plurality of driving disks on said shafts; means for driving said shafts; a raised circular cam track adjacent the bottom of each of said cylinders; cam rollers on the lower ends of said staves, said cam rollers adapted to ride up on said cam tracks and raise said staves during a portion of the rotation of each of said cylinders; said driving disks adapted to be engaged by said friction rollers on their undersides when said staves are raised to rotate said picking fingers in one direction and adapted to be engaged on their upper sides by said friction disks when said staves are down to drive said picking fingers in a reverse direction; and means for stripping material from said fingers when rotating in said reverse direction.

6. In a device of the character described; a pair of parallelly arranged cylinders; means for rotating said cylinders toward each other; a plurality of vertically slidable staves mounted on each of said cylinders; a series of picking fingers rotatably mounted on each of said staves; friction wheels mounted on the inner ends of said picking fingers and lying inside of said cylinders; a concentrically arranged shaft lying inside of each of said cylinders; a plurality of driving disks on said shafts; means for driving said shafts; a raised circular cam track adjacent the bottom of each of said cylinders; cam rollers on the lower ends of said staves, said cam rollers adapted to ride up on said cam tracks and raise said staves during a portion of the rotation of each of said cylinders; said driving disks adapted to be engaged by said friction rollers on their undersides when said staves are raised to rotate said picking fingers in one direction and adapted to be engaged on their upper sides by said friction disks when said staves are down to drive said picking fingers in a reverse direction; and means for stripping material from said fingers when rotating in said reverse direction, said means comprising rotating circular saws lying adjacent said fingers, and rotating brushes lying adjacent said saws.

In testimony whereof, I have hereunto set my hand this 30th day of June 1926.

WENSEL MORAVA.